United States Patent [19]

Yamada et al.

[11] Patent Number: 5,062,618

[45] Date of Patent: Nov. 5, 1991

[54] VIBRATION-INSULATIVE SUPPORT MEMBER WITH CORDS

[75] Inventors: Yasuhiko Yamada; Minaki Tomio, both of Osaka; Toshiyuki Miyamae, Hyogo; Norio Kawai, Osaka, all of Japan

[73] Assignee: Toyo Tire & Rubber Co., Ltd., Osaka, Japan

[21] Appl. No.: 365,459

[22] Filed: Jun. 13, 1989

[30] Foreign Application Priority Data

Jun. 16, 1988 [JP] Japan .................. 63-148606

[51] Int. Cl.⁵ .......................... F16M 13/00; F16F 7/00
[52] U.S. Cl. ...................... 267/140.4; 267/141.2; 267/148
[58] Field of Search ............... 267/140.3, 140.4, 141.1, 267/141.2, 141.6, 148, 149, 152, 293, 294, 141; 248/634, 570; 52/167 R; 264/173, 174; 428/37, 371, 374, 295

[56] References Cited

U.S. PATENT DOCUMENTS

| | | | |
|---|---|---|---|
| 99,475 | 2/1870 | Rhinelander | 267/166 |
| 2,766,163 | 10/1956 | Schwartz et al. | 267/140.4 X |
| 3,024,749 | 3/1962 | Haskell et al. | 267/141.1 X |
| 3,544,415 | 12/1970 | Price et al. | 267/141.1 X |
| 3,606,295 | 9/1971 | Appleton | 267/140.3 X |
| 3,610,610 | 10/1971 | Chassagne | 267/152 |
| 4,278,726 | 7/1981 | Wieme | 267/140.3 X |
| 4,763,882 | 8/1988 | Nishiyama et al. | 267/33 |
| 4,817,921 | 4/1989 | Stevenson | 267/140.4 X |
| 4,936,814 | 6/1990 | Colley et al. | 428/295 X |

FOREIGN PATENT DOCUMENTS

49051/74 5/1974 Japan .
211471/87 9/1987 Japan .

*Primary Examiner*—Robert J. Oberleitner
*Attorney, Agent, or Firm*—Sterne, Kessler, Goldstein & Fox

[57] ABSTRACT

A vibration-insulative support member includes an elastic body made mainly of rubber, and a pair of upper and lower flanges secured to upper and lower ends of said elastic body, respectively. The elastic body includes cords disposed in the rubber portion of the elastic body. The cords are arranged in layers substantially parallel to the upper and lower flanges in such a manner that the cords in each layer are distributed in a plan substantially parallel to the upper and lower flanges.

23 Claims, 2 Drawing Sheets

VIBRATION-INSULATIVE SUPPORT MEMBER WITH CORDS

BACKGROUND OF THE INVENTION

1. Field of the Invention

This invention relates to a vibration-insulative support member for supporting a structure, such as a building structure and an apparatus, from below so as to prevent vibration, caused for example by an earthquake, from being transmitted to such a structure.

2. Prior Art

There are known various vibration-insulative support members for supporting a structure, such as a building structure and an apparatus, from below. One such example is a compression spring as disclosed in Japanese Laid-Open (Kokai) Patent Application No. 49051/74. This compression spring is formed by coating a plurality of cord fabrics, each composed of steel cords or the like arranged biaswise, with rubber, and winding the thus rubberized cord fabrics around a cylindrical body of rubber to form a plurality of layers, the directions of the cords of each adjacent layers of cord fabrics being opposite to each other.

Another example is a vibration-insulative device as disclosed in Japanese Laid-Open Patent Application No. 211471/87. This vibration-insulative device is formed by alternately laminating rigid plates, such as steel plates, and soft plates, such as rubber plates and bonding them together to form a laminate, forming a cylindrical hole a central portion of the laminate, and sealing a viscous material such as aromatic oil in the cylindrical hole.

The above-mentioned compression spring disclosed in Japanese Laid-Open Patent Application No. 49051/74 is adapted for use in an automobile suspension. Since the cylindrical body of rubber is covered by the rubberized cord fabrics having the cords arranged biaswise, such a compression spring has such a low longitudinal rigidity that it can efficiently absorb vertical vibration. On the other hand, the compression spring has such a high transverse rigidity that the layers between which such compression springs are interposed can not be easily displaced relative to each other in a horizontal direction. Therefore, when the ground is subjected to a horizontal quake, the structure supported thereon could not be brought into a stationary condition. For this reason, such compression spring could not be used as a vibration-isolation member.

Since the vibration-isolation device disclosed in Japanese Laid-Open Patent Application No. 211471/87 comprises the rigid and soft plates stacked alternately one upon another, the transverse rigidity can be lowered by reducing the thickness of each plate and increasing the number of the stacked plates, thereby enhancing a vibration-isoration effect. In such a case, however, since the thickness of the rubber layer is reduced, the longitudinal rigidity is increased, so that an vibration-insulative ability in the vertical direction is lowered, and in addition the use of such an increased number of the stacked plates has made the manufacture difficult.

SUMMARY OF THE INVENTION

It is therefore an object of this invention to provide a vibration-insulative support member which is excellent in both vertical vibration-insulative properties and horizontal vibration-isolation properties, and can be manufactured easily.

According to one aspect of the present invention, there is provided a vibration-insulative support member comprises an elastic body made mainly of rubber, and a pair of upper and lower flanges secured to upper and lower ends of said elastic body, respectively; said elastic body including cords disposed in the rubber portion of said elastic body, said cords being arranged in layers substantially parallel to the upper ant lower flanges in such a manner that said cords in each layer are distributed in a plan substantially parallel to said upper and lower flanges.

According to another aspect of the present invention, there is provided vibration-insulative support member comprises an elastic body made mainly of rubber, and a pair of upper and lower flanges secured to upper and lower ends of said elastic body, respectively; said elastic body including a cord disposed in the rubber portion of said elastic body, said cord being so arranged as to form layers of said cord generally parallel to the upper and lower flanges, and said cord disposed in each layer being distributed in a plan generally parallel to said upper and lower flanges.

The cord used in the present invention is, like a cord used in an automobile tire, is made of polyester, nylon, rayon, steel, a piano wire or the like. The diameter of the cord is 0.2 to 3 mm and preferably 0.4 to 0.8 mm. The directions of the cords are arbitrary so long as the cords are disposed in horizontal planes. For example, a cord fabric formed by the above cords is rubberized, and the rubberized cord fabric is cut into a suitable shape such as a circular shape, a square shape and a polygonal shape (having at least five (pentagon) apexes). Such rubberized cord fabrics and rigid plates are alternately laminated in a predetermined proportion and bonded together. According to another procedure, such rubberized cord fabrics, soft plates made only of rubber, and rigid plates are alternately laminated in a predetermined proportion and bonded together. According to a further procedure, only such rubberized cord fabrics are laminated, and alternatively such rubberized cord fabrics and soft plate made only of rubber may be alternately laminated and bonded together. According to a still further procedure, an elongated rubberized cord fabric is rolled so that the cords are disposed in the circumferential direction, and the roll thus obtained is oriented so that its axis or center line is disposed vertically and that each cord is in the form of a vortex in a horizontal plane. According to a further procedure, a single cord is coated with rubber by grommeting, and the rubber-coated cord is spirally wound into a roll having a plurality of layers. According to a further procedure, a mesh fabric is woven using warp and weft cords, and such mesh fabrics are cut into a suitable shape such as a circular shape and a square shape, and are laminated together with soft plates and/or rigid plates. In the case where the rubberized cord fabrics are cut into a circular shape, a square shape or other shapes and are laminated together with the rigid plates, etc., the cord fabrics are preferably laminated in such a manner that the directions of the cords of each adjacent fabrics are angularly displaced with respect to each other by a suitable angle, such as 90 degrees and 45 degrees, so that the overall construction can have an isotropic nature. This is desirable from the viewpoint of safety against an earthquake. The vertical distance between the cords as well as the horizontal distance is 0.2 to 8 mm and preferably 0.5 to 4 mm.

The rubber which is applied to the cord fabric and the mesh fabric as a topping is natural rubber, ethylene propylene rubber, ethylene propylene diene rubber, nitrile rubber, butyl rubber, butyl halide rubber, chloroprene rubber, isoprene rubber, styrene-butadiene rubber, butadiene rubber, ethylenevinyl acetate rubber, plasticized vinyl chloride rubber, or polyurethane. A preferred hardness of such rubber after vulcanization is 30 to 70 degrees (JIS-A rubber hardness).

The rigid plate used in combination with the rubberized cord fabric or the rubberized mesh fabric is made of metal such as iron, aluminum, copper and stainless steel, a thermoplastic resin such as polystyrene, polyethylene, polypropylene, ABS, polyvinyl chloride, polymethyl methacrylate, polycarbonate, polyacetal, nylon, polyether chloride, polytetrafluoroethylene, acetyl cellulose and ethyl cellulose, and a thermosetting resin such as phenolic resin, urea resin, unsaturated polyester, epoxy resin, alkyd resin and melamine resin. Also, ceramics, FRT, wood, paper sheet or slate plate can be used. Preferably, the thickness of the rigid plate is 1 to 5 mm, and its hardness is preferably not less than 95 degrees in terms of JIS-A rubber hardness.

A central cylindrical hole or space may be formed in the central portion of the elastic body having the cords arranged in the above-mentioned manner. In this case, a viscous material is sealed in the central hole. Examples of such viscous material include oil of the aromatic, naphthenic or paraffinic type, castor oil, cottonseed oil, linseed oil, colza oil, soybean oil, palm oil, coconut oil, peanut oil, rosin oil, or high-hysteresis rubber which is produced, for example, by blending 15 to 100 parts by weight of cyclopentadiene or dicyclopentadiene into 100 parts by weight of ordinary rubber and vulcanizing the blend.

A plasticizer can be added to the above viscous material. Examples of such plasticizer include phthalic acid, isophthalic acid, adipic acid, tetrahydrophthalic acid, sebacic acid, azelaic acid, maleic acid, fumaric acid, trimellitic acid, citric acid, itaconic acid, oleic acid, ricinoleic acid, stearic acid, phosphoric acid, sulfonic acid, glycolic acid, glycerin, paraffin, and a derivative of epoxy.

A filler can also be added to the above viscous material. Examples of such filler include clay, diatomaceous earth, carbon black, silica, talc, barium sulfate, calcium carbonate, magnesium carbonate, metallic oxide, mica, graphite, aluminum hydroxide, metallic powder, pulverized wood, glass powder, ceramics powder, plastics powder, and long or short fibers such as straw, animal hair, glass fiber, metallic fiber and synthetic resin fiber.

Also, a tackifier can be added to the above viscous material. Examples of such tackifier include coumarone resin, phenol-terpene resin, petroleum hydrocarbon resin and rosin derivative.

The above viscous material can be filled into a container made of a material which is not attacked by the viscous material, and the container is inserted into the central hole in the elastic body. In the case where the elastic body is of a nature resistant to the viscous material, the viscous material may be filled directly in the central cylindrical hole in the elastic body.

After the elastic body having the cords distributed in the rubber is vulcanized, the flanges are adhesively bonded and secured to the upper and lower surfaces of the elastic body, respectively. The elastic body having the cords distributed therein may be vulcanized after the outer peripheral surface of the elastic body is covered by similar rubber. In the case where the elastic body has the central cylindrical hole for holding the viscous material, the elastic body is first vulcanized, and then the lower flange is fixedly secured to the lower surface thereof, and then the viscous material is filled in the central hole, and then the upper end of the central hole is closed by the upper flange.

The cords are arranged in planes parallel to the flanges, and these cords are coated with rubber. In other words, the rubber layers disposed parallel to the flanges are reinforced by the cords. With respect to the property of sliding relative to its adjacent layer, the cord-reinforced rubber layer is not so different from the soft plate, made only of rubber, and the rigid plate such as a metal plate, and the compression elasticity of the cord-reinforced rubber layer in the vertical direction is between those of the soft plate, made only of rubber, and the rigid plate. Therefore, by suitably determining the density of longitudinal and transverse arrangement and the pitch (distance) of the rigid plates, the transverse rigidity of the vibration-insulative the support member of the present invention can be maintained at generally the same level as that of an vibration-insulative support member comprising a single body of rubber whereas the longitudinal rigidity is higher than it but is lower as compared with a vibration-insulative support member comprising a laminate of rubber soft plates and rigid plates. Therefore, the support member of the present invention can perform excellent vibration-isolation and vibration-insulative functions. In addition, in the present invention, the cord-reinforced layers will not be subjected to transverse bulge which has been encountered with soft plates having an increased thickness.

Therefore, in the case where the elastic body comprises a laminate composed of the cord-reinforced soft plates (i.e., rubberized cord fabrics or rubberized mesh fabrics) and the rigid plates (such as metal plates), or in the case where the elastic body comprises a laminate composed of the cord-reinforced soft plates, soft plates made only of rubber, and the rigid plates, the longitudinal rigidity of the elastic body can be adjusted by suitably determining the ratio of the soft plates to the rigid plates. When providing such a laminated construction, groups of four laminated cord-reinforced soft plates can be used, in which case the directions of the cords of the four cord-reinforced soft plates of each group are angularly displaced, for example, by 90 degrees relative to one another. Also, with the use of the cord-reinforced soft plates, the number of the rigid plates to be used is reduced, which facilitates the assemblage of the elastic body. In the case where the elastic body is formed by rolling either the elongated rubberized cord fabric or the single rubber-coated cord, the number of the component parts is reduced, which further facilitates the manufacture of the elastic body.

In the case where the elastic body has the cylindrical central hole in which the viscous material is sealed, the attenuation of the vibration of the vibration-insulative support member in a horizontal direction can be effected in a shorter time when an earthquake occurs. Further, when a plasticizer such as phthalic acid is added to the viscous material, the attenuation effect is further enhanced, and the addition of a tackifier to the viscous material still further enhances the attenuation effect.

DESCRIPTION OF THE PREFERRED EMBODIMENTS OF THE INVENTION

Figure 1:
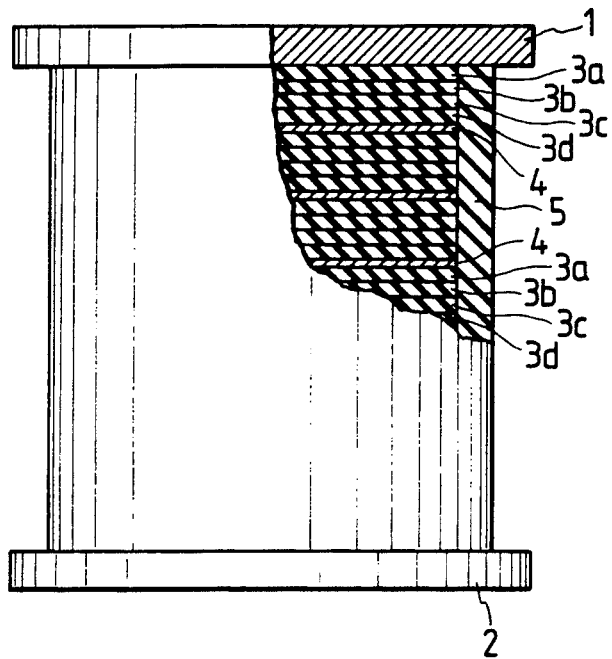
FIG. 1 is a partly-broken, front-elevational view of a vibration-insulative support member provided in accordance with the present invention.
Figure 2:
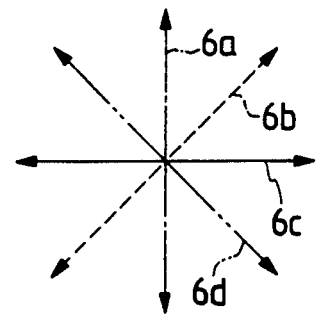
FIG. 2 is a schematic plan view, showing the directions of cords of cord-reinforced soft plates of the support member.

FIG. 1 shows a vibration-insulative support member which comprises an elastic body, an upper flange 1 secured to an upper surface or end of the elastic body, a lower flange 2 secured to a lower surface of the elastic body, and a cylindrical rubber plate or layer 5 wound around the elastic body to cover the same. The elastic body comprises groups of four laminated cord-reinforced soft plates 3a, 3b, 3c and 3d, and rigid plates (iron plates) 4 bonded to and alternating with the groups of four cord-reinforced soft plates. Each group of four cord-reinforced soft plates 3a, 3b, 3c and 3d are stacked one upon another in such a manner that the directions of their cords are angularly displaced with respect to one another by 45 degrees. More specifically, as shown in FIG. 2, the cords 6b of the second layer of cord-reinforced soft plate 3b are angularly displaced by 45 degrees relative to the cords 6a of the uppermost layer of cord-reinforced soft plates 3a. The cords 6c of the third layer of cord-reinforced soft plates 3c are further displaced by 45 degrees, and the cords 6d of the fourth layer of cord-reinforced soft plates 3d are further displaced by 45 degrees. The angular positions of the cords 6b and 6c of the second and third layers may be interchanged.

Figure 3:
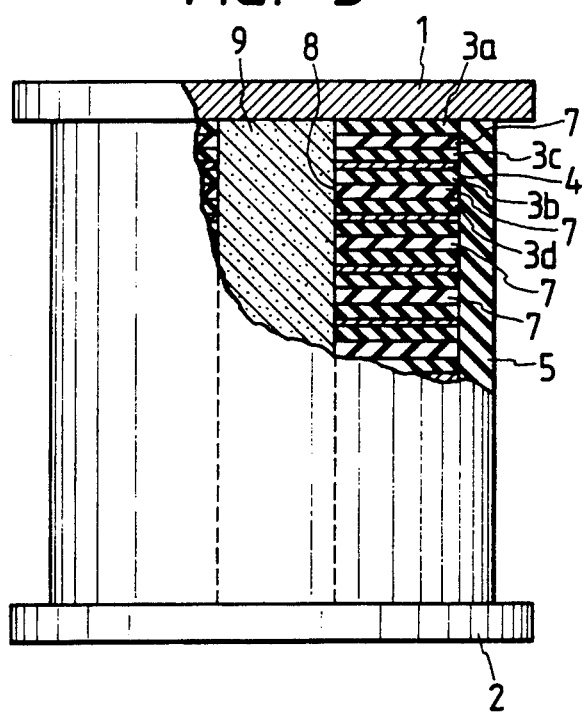
FIG. 3 is a view similar to FIG. 1, but showing a modified support member.

FIG. 3 shows a modified vibration-insulative support member. In this embodiment, a repeating unit comprises a laminate composed of the first cord-reinforced soft plate 3a, a soft plate 7 made solely of rubber, the third cord-reinforced soft plate 3c, the rigid plate 4, the second cord-reinforced soft plate 3b, a soft plate 7 made solely of rubber, the fourth cord-reinforced soft plate 3d and the rigid plate 4. The repeating units are stacked to form an elastic body. The elastic body has a central hole or space 8 of a cylindrical shape formed axially therethrough, and a viscous material 9 is sealed in the central hole 8.

There was prepared a cord fabric made of polyester cords (1500 deniers/2 cords) and woven at a density of 16 cords/2.5 mm. A topping was applied to the cord fabric, the topping comprising a rubber compound composed of 100 parts by weight of natural rubber (SIR-5L), 30 parts by weight of carbon black (SRF), 15 parts by weight of oil (process oil X-140) and 1 part by weight of sulfur. The rubberized cord fabrics (the cord-reinforced soft plates 3) thus obtained are laminated together with the rigid plates 4 as shown in FIG. 1 (but the cylindrical rubber layer 5 was omitted) and was vulcanized at 120° C. for 5 hours to prepare a vibration-insulative support member of Example 1. The hardness of the vulcanized rubber was 40 degrees (JIS-A). A vibration-insulative support member of Comparative Example 1 was prepared using a single body of the same rubber as that of Example 1, and also a vibration-insulative support member of Comparative Example 2 was also prepared using soft plates each made solely of the same rubber: as that of Example 1, and the rigid plates. Comparison between Example 1 and Comparative Examples 1 and 2 was made with respect to the transverse and longitudinal rigidities. The results obtained are shown in Table 1 below. In Table 1, with respect to "thickness of soft plate" of Example 1, this thickness means the total of the thicknesses of the group of four cord-reinforced soft plates whose cords are displaced angularly relative to one another, and with respect to "number of soft plates" of Example 1, the group of four cord-reinforced soft plates are counted as one layer since the group of four cord-reinforce soft plates are joined together integrally by the vulcanization in such a manner that the boundaries between them disappear. Further, the transverse rigidity as well as the longitudinal rigidity is indicated in terms of a unit volume having an area of 1 cm² and a height of 1 cm.

TABLE 1

|  | Compara. Exmp. 1 | Compara. Exmp. 2 | Exmp. 1 |
|---|---|---|---|
| Diameter (mm) | 100 | 100 | 100 |
| Height (mm) | 80.7 | 80.7 | 80.7 |
| Thickness of iron plate (mm) | — | 1.2 | 1.2 |
| Number of iron plates | — | 20 | 6 |
| Thickness of soft plate (mm) | 80.7 | 2.7 | 10.5 |
| Number of soft plates | 1 | 21 | 7 |
| Construction | Single body | Laminate | Laminate |
| Transverse rigidity (kgf/mm) | 5 | 7 | 8 |
| Longitudinal rigidity (kgf/mm) | 21 | 3200 | 1050 |

It is considered that the lower limits of the transverse rigidity and longitudinal rigidity, which achieve ideal vibration-isolation properties when a vibration-insulative support member is subjected to a surface pressure of 20 kg/cm², a vibration frequency of 3 Hz and a strain of 5%, are 0.009 kgf/mm and 40 kgf/mm, respectively. The closer to such lower limits, the better. With respect to the vibration-insulative support member of Comparative Example 1 using the single body of rubber, the longitudinal rigidity does not reach the lower limit, and therefore this support member can not be used for vibration-insulative purposes. With respect to the vibration-insulative support member of Comparative Example 2 using the laminate of the soft plates solely of rubber and the rigid plates, the longitudinal rigidity is extremely high, and therefore this support member lacks in vibration-insulative properties. When it is intended to lower the longitudinal rigidity of Comparative Example 2 by increasing the thickness of the soft plates and instead reducing the number of the soft plates, the soft plates of rubber will bulge in the transverse direction and rupture. In contrast, the vibration-insulative support member of Example 1 of the present invention has a sufficient longitudinal rigidity for such a support member, and has a size about one third (⅓) of that of the support member of Comparative Example 2, and has adequate vibration-insulative properties for practical use. In addition, the support member of Example 1 is not so different in transverse rigidity from the support member of Comparative Example 1, and has adequate earthquake-insulative properties.

Figure 4:
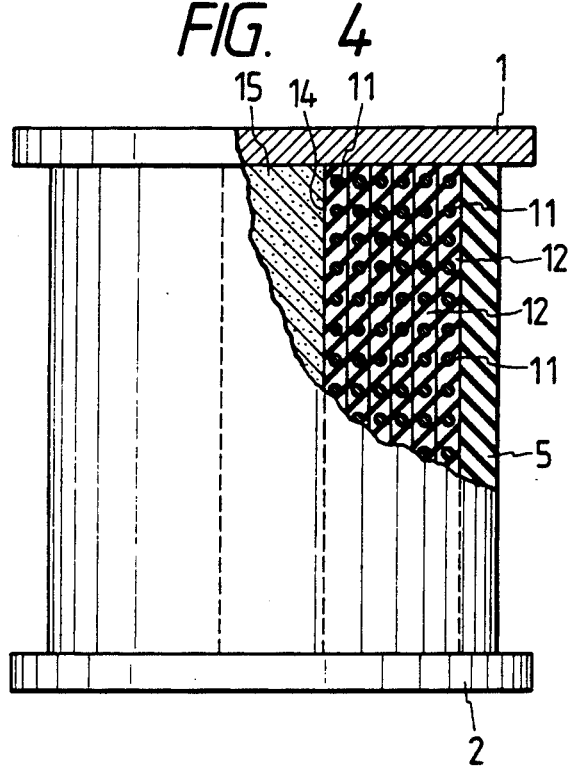
FIG. 4 is a view similar to FIG. 1, but showing another modified support member.
Figure 5:
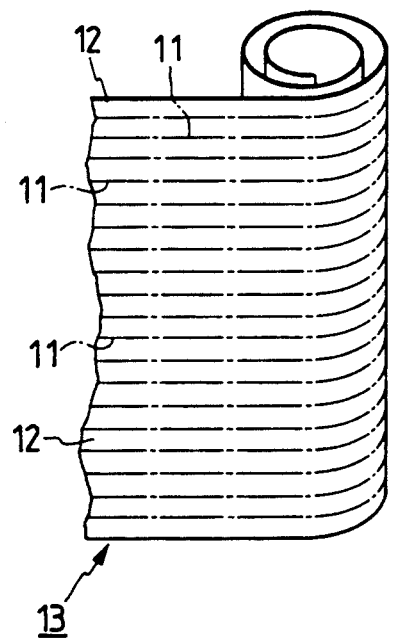
FIG. 5 is a perspective view showing the manner of forming the support, member of FIG. 4.

FIG. 4 shows another modified vibration-insulative support member of the present invention. More specifically, a rubberized cord fabric is rolled to provide an elastic body. Reference numeral 11 denotes a cord, and reference numeral 12 denotes a rubber layer. For manufacturing this support member, the rubberized cord fabric 13 is formed into a roll as shown in FIG. 5, and after vulcanization, a viscous material 15 is sealed in a central hole 14 in the roll (see FIG. 4). In this case, each cord 11, which is a warp thread of the cord fabric, is in the form of a vortex or volute and is disposed in a horizontal plane parallel to upper and lower flanges 1 and 2. After the vulcanization, the cylindrical boundaries of the turns of the rolled cord fabric disappears.

Figure 6:
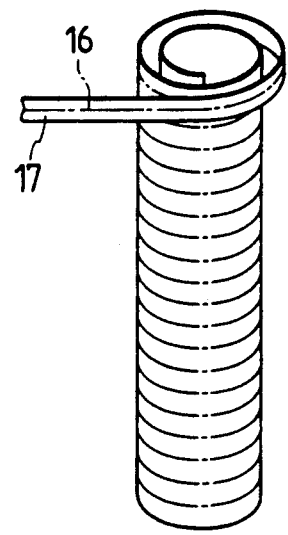
FIG. 6 is a perspective view showing the manner of forming a further modified support member.

FIG. 6 shows a further modified vibration-insulative support member of the present invention. More specifically, a single cord 16 is coated with rubber by grommeting, so that a rubber layer or coating 17 is formed around the cord 16. The rubber-coated cord 16 is tightly helically wound upwardly and downwardly to form a roll-like elastic body. Thus, in this case, the elastic body is formed by the single cord 16, and therefore the manufacture is easy.

A cord fabric of the same construction as that used in the above-mentioned Example 1 was subjected to topping, using a rubber compound of the same composition as that of Example 1, to thereby form a rubberized cord fabric 13. The rubberized cord fabric 13 was wound around a core (which had a diameter of 68.5 mm) six times, and was vulcanized in a manner mentioned above to prepare a vibration-insulative support member of Example 2 as shown in FIG. 4 (although the cylindrical rubber layer 5 was omitted). Also, a cord of the same denier as that of Example 1 was coated with rubber by grommeting to form a rubber-coated cord 16. Then, as shown in FIG. 6, the rubber-coated cord 16 was spirally wound into a coil-shape or roll-shape having six layers or turns in the radial direction, and the resultant roll was vulcanized to prepare an vibration-insulative support member of Example 3. The shape and properties of the support members of Examples 2 and 3 are indicated in Table 2 below.

TABLE 2

|  | Exmp. 2 | Exmp. 3 |
| --- | --- | --- |
| Diameter (mm) | 100 | 100 |
| Diameter of cylindrical hole (mm) | 68.5 | 68.5 |
| Height (mm) | 80.7 | 80.7 |
| Rigid plate | — | — |
| Distance between vertically spaced cords (mm) | 1.6 | 1.6 |
| Number of cords arranged vertically | 50 | 50 |
| Transverse rigidity (kgf/mm) | 13 | 15 |
| Longitudinal rigidity (kgf/mm) | 1300 | 1200 |

As is clear from Table 2, Examples 2 and 3 are substantially equal in transverse and longitudinal rigidities, and the transverse rigidity is about twice that of the above-mentioned Example 1, and the longitudinal rigidity is 1.14 to 1.24-fold of that of Example 1. Thus, the transverse and longitudinal rigidities of Examples 2 and 3 are sufficient for practical use.

As described above, in the vibration-insulative support members of the present invention, the cord or cords are distributed in the rubber layers disposed substantially parallel to the upper and lower flanges. Therefore, as compared with the conventional support member having the soft plates made only of rubber, the support member of the present invention has a higher longitudinal rigidity, and the transverse rigidity is not so different. Moreover, when a load is applied to the support member of the present invention, the support member will not bulge transversely and will not rupture. Thus, the support member of the present invention can have such transverse and longitudinal rigidities required for performing satisfactory vibration-insulative ant vibration-isolation functions.

What is claimed is:

1. A vibration-insulative support member comprising an elastic body made mainly of rubber comprising a rubber portion, and a pair of upper and lower flanges secured to upper and lower ends of said elastic body, respectively; said elastic body including cords disposed in the rubber portion of said elastic body, said cords being arranged in at least two directly adjacent layers substantially parallel to the upper and lower flanges in such a manner that said cords in each layer are distributed in a plane substantially parallel to said upper and lower flanges.

2. A vibration-insulative support member of claim 1, in which said cord is made of a material selected from a group of polyester, nylon, rayon, steel and a piano wire.

3. A vibration-insulative support member of claim 1 in which the diameter of said cords is 0.2 to 3 mm.

4. A vibration-insulative support member of claim 1 further comprising a cover layer made of rubber and wound around said elastic body to cover said elastic body.

5. A vibration-insulative support member of claim 1, in which a central cylindrical hole is formed in the central portion of said elastic body for sealing a viscous material.

6. A vibration-insulative support member of claim 1, in which said elastic body comprises groups of four laminated cord-reinforced soft plates bonded to and alternating with the groups of for-reinforced soft plates, wherein each group of four cord-reinforced soft plates are stacked one upon another in such a manner that the directions of their cords are angularly displaced with respect to one another by 45 degrees.

7. A vibration-insulative support member of claim 1, in which said elastic body has a plurality of repeating units, each comprising a laminate composed of a first cord-reinforced soft plate, a soft plate made solely of rubber, a third cord reinforced soft plate, a rigid plate, a second cord-reinforced soft plate, a soft plate made solely of rubber, a fourth cord-reinforced soft plate and a rigid plate.

8. A vibration-insulative support member of claim 1, in which a cord fabric formed by said cords is rolled so that the cords are disposed in the circumferential direction, and the roll thus obtained is oriented so that its axis is disposed vertically and each cord is in the form of a vortex in a horizontal plane.

9. A vibration-insulative support member of claim 1 further comprising:
   a cord fabric formed by said cords and rubberizing therewith; and
   rigid plates alternately laminated in a predetermined proportion and bonded together.

10. A vibration-insulative support member of claim 1 further comprising:

a mesh fabric formed by said cords and then cut into a suitable shape; and rigid plate laminated together with said mesh fabric.

11. A vibration-insulative support member of claim 1, in which said cord is coated with rubber by grommeting, and the rubber-coated cord is spirally wound into a roll having a plurality of layers.

12. A vibration-insulative support member comprising an elastic body made mainly of rubber and a pair of upper end lower flanges secured to the upper and lower ends of said elastic body, respectively; said elastic body including a plurality of radially corded soft plates, said radially corded soft plates being stacked parallel to said upper and lower flanges, wherein said radially corded soft plates are arranged in at least two directly adjacent layers.

13. A vibration-insulative support member comprising an elastic body made mainly of rubber and a pair of upper and lower flanges secured to the upper and lower ends of said elastic body, respectively; said elastic body including a plurality of linearly parallel corded soft plates, said linearly parallel corded soft plates being stacked parallel to said upper and lower flanges, wherein said linearly parallel corded soft plates are arranged in at least two directly adjacent layers.

14. A vibration-insulative support member comprising an elastic body made mainly of rubber and a pair of upper and lower flanges secured to the upper and lower ends of said elastic body, respectively; said elastic body including a plurality of meshed parallel corded soft plates said meshed parallel corded soft plates being stacked parallel to said upper and lower flanges, wherein said meshed parallel corded soft plates are arranged in at least two directly adjacent layers.

15. A vibration-insulative support member according to claim 12, 13, or 14, wherein the cord of said corded soft plate is made of a material selected from a group of at least one of polyester, nylon, rayon, steel, and a piano wire.

16. A vibration-insulative support member of claim 12, in which the diameter of said cord is 0.2 to 3 millimeters.

17. A vibration-insulative support member of claim 12, 13 or 14, further comprising a cover layer made of rubber and wound around said elastic body to cover said elastic body.

18. A vibration-insulative support member of claim 12, 13 or 14, in which a cylindrical hole is formed in the central portion of said elastic body for sealing a viscous material.

19. A vibration-insulative support member of claim 13, in which said elastic body comprises groups of laminated cord reinforced soft plates bonded to and alternating with the groups of cord reinforced soft plates, wherein each group of cord reinforced soft plates are stacked one upon another in such a manner that the direction of their cords is angularly displaced from each other.

20. A vibration-insulative support member of claim 19, wherein said soft plates are angularly displaced by 45 degrees.

21. A vibration-insulative support member of claim 19, wherein said soft plates are angularly displaced by 90 degrees.

22. A vibration-insulative support member of claim 12, 13 or 14, in which said elastic body has a plurality of repeating units, each of said units comprising a laminated composed of a first cord reinforced soft plate, a soft plate made solely of rubber, a third cord reinforced soft plate, a rigid plate, second cord reinforced soft plate, a soft plate made solely of rubber, a fourth cord reinforced soft plate and a rigid plate.

23. A vibration-insulative support member comprises an elastic body made mainly of rubber comprising a rubber portion, and a pair of upper and lower flanges secured to upper and lower ends of said elastic body, respectively; said elastic body including cords disposed in the rubber portion of said elastic body, said cords being arranged in at least two adjacent layers substantially parallel to the upper and lower flanges in such a manner that said cords in each layer are distributed in a plane substantially parallel to said upper and lower flanges, said elastic body having a plurality of repeating units, each comprising a laminated composed of a first cord-reinforced soft plate, a soft plate made solely of rubber, a third cord reinforced soft plate, a rigid plate, a second cord-reinforced soft plate, a soft plate made solely of rubber, a fourth cord-reinforced soft plate and a rigid plate.

* * * * *